(12) United States Patent
Lin et al.

(10) Patent No.: US 8,793,675 B2
(45) Date of Patent: Jul. 29, 2014

(54) LOOP PARALLELIZATION BASED ON LOOP SPLITTING OR INDEX ARRAY

(75) Inventors: Jin Lin, San Jose, CA (US); Nishkam Ravi, Princeton, NJ (US); Xinmin Tian, Union City, CA (US); John L. Ng, San Jose, CA (US); Renat V. Valiullin, Novosibirsk (RU)

(73) Assignee: Intel Corporation, Santa Clara, CA (US)

( * ) Notice: Subject to any disclaimer, the term of this patent is extended or adjusted under 35 U.S.C. 154(b) by 575 days.

(21) Appl. No.: 12/978,465

(22) Filed: Dec. 24, 2010

(65) Prior Publication Data
US 2012/0167069 A1    Jun. 28, 2012

(51) Int. Cl.
G06F 9/45    (2006.01)

(52) U.S. Cl.
USPC ............................ 717/160; 717/150; 717/159

(58) Field of Classification Search
None
See application file for complete search history.

(56) References Cited

U.S. PATENT DOCUMENTS

| | | | |
|---|---|---|---|
| 5,842,022 A | 11/1998 | Nakahira et al. | |
| 6,038,398 A | 3/2000 | Schooler | |
| 6,708,331 B1 * | 3/2004 | Schwartz | 717/160 |
| 6,970,985 B2 * | 11/2005 | Moritz | 711/154 |
| 7,076,776 B2 * | 7/2006 | Kim et al. | 717/160 |
| 7,089,545 B2 * | 8/2006 | Bera | 717/160 |
| 7,603,546 B2 * | 10/2009 | Narayanasamy et al. | 717/159 |
| 7,797,329 B2 * | 9/2010 | Lujan Moreno et al. | 717/159 |
| 7,823,141 B1 * | 10/2010 | Gustafson et al. | 717/150 |
| 8,028,281 B2 * | 9/2011 | Bera | 717/159 |
| 8,037,462 B2 * | 10/2011 | Archambault et al. | 717/159 |
| 8,151,255 B2 * | 4/2012 | Gustafson et al. | 717/160 |
| 8,239,843 B2 * | 8/2012 | Song et al. | 717/160 |
| 8,312,442 B2 * | 11/2012 | Song et al. | 717/150 |
| 8,359,587 B2 * | 1/2013 | Song et al. | 717/160 |
| 8,468,508 B2 * | 6/2013 | Eichenberger et al. | 717/150 |
| 8,549,499 B1 * | 10/2013 | Ding et al. | 717/150 |
| 8,589,901 B2 | 11/2013 | Lin et al. | |
| 8,645,933 B2 * | 2/2014 | Schwartz | 717/159 |
| 8,677,337 B2 * | 3/2014 | Song et al. | 717/160 |
| 2001/0044930 A1 | 11/2001 | Miyata et al. | |
| 2004/0010675 A1 * | 1/2004 | Moritz | 711/202 |

(Continued)

FOREIGN PATENT DOCUMENTS

| | | |
|---|---|---|
| EP | 1731998 A1 | 12/2006 |
| TW | I319851 B | 1/2010 |
| WO | 2012/087988 A2 | 6/2012 |
| WO | 2012/087988 A3 | 9/2012 |

OTHER PUBLICATIONS

Baghdadi et al., "The Potential of Synergistic Static, Dynamic and Speculative Loop Nest Optimizations for Automatic Parallelization", PESPMA 2010, Saint-Malo, France, Jun. 22, 2010, pp. 54-58; <http://www.di.ens.fr/~baghdadi/public/papers/riyadh_pespma_2010.pdf>.*

(Continued)

*Primary Examiner* — Thuy Dao
*Assistant Examiner* — Ben C Wang
(74) *Attorney, Agent, or Firm* — Caven & Aghevli LLC

(57) ABSTRACT

Methods and apparatus to provide loop parallelization based on loop splitting and/or index array are described. In one embodiment, one or more split loops, corresponding to an original loop, are generated based on the mis-speculation information. In another embodiment, a plurality of subloops are generated from an original loop based on an index array. Other embodiments are also described.

29 Claims, 8 Drawing Sheets

(56) References Cited

U.S. PATENT DOCUMENTS

| | | | |
|---|---|---|---|
| 2005/0144602 | A1 | 6/2005 | Ngai et al. |
| 2006/0048122 | A1 | 3/2006 | Barton et al. |
| 2008/0127146 | A1* | 5/2008 | Liao et al. ............... 717/150 |
| 2008/0244512 | A1 | 10/2008 | Guo et al. |
| 2009/0276766 | A1* | 11/2009 | Song et al. ............... 717/159 |
| 2009/0288075 | A1* | 11/2009 | Song et al. ............... 717/160 |
| 2009/0307674 | A1* | 12/2009 | Ng et al. .................. 717/160 |
| 2010/0146495 | A1* | 6/2010 | Song et al. ............... 717/160 |
| 2012/0117552 | A1* | 5/2012 | Krishnaiyer et al. ..... 717/160 |
| 2012/0167068 | A1 | 6/2012 | Lin et al. |

OTHER PUBLICATIONS

Du et al., "A Cost-Driven Compilation Framework for Speculative Parallelization of Sequential Programs", 2004 ACM, PLDI'04, Jun. 9-11, 2004 Washington, DC, USA, pp. 71-81; <http://dl.acm.org/citation.cfm?doid=996893.996852>.*

Barton et al., "Generalized Index-Set Splitting", 2005 Springer-Verlag Berlin Heidelberg 2005, CC 2005, LNCS 3443, pp. 106-120, 2005, pp. 106-120; <http://webdocs.cs.ualberta.ca/~amaral/papers/BartonCC05.pdf>.*

Parsa et al., "Loop Parallelization in Multi-dimensional Cartesian Space", 2007 Springer-Verlag Berlin Heidelberg, PSI 2006, LNCS 4378, pp. 335-348; <link.springer.com/.../10.1007/02F978-....>.*

Lin et al., "Analysis of Irregular Single-Indexed Array Accesses and Its Applications in Compiler Optimizations", 2000 Springer-Verlag Berlin Heidelberg, LNCS 1781, pp. 202-218; <link.springer.com/.../10.1007/02F3-54...>.*

Liu et al., "Optimal Loop Parallelization for Maximizing Iteration-Level Parallelism", 2009 ACM, Cases'09, Oct. 11-16, 2009, Grenoble, France, pp. 67-76; <http://dl.acm.org/results.cfm?h=1&cfid=305675875&cftoken=41809730>.*

Kyoko Iwasawa, "Detecting Method of Parallelism from Nested Loops with Loop Carried Data Dependences", 2010 IEEE, pp. 287-292; <http://ieeexplore.ieee.org/stamp/stamp.jsp?tp=&arnumber=5628926>.*

Boulet et al., "Loop Parallelization algorithms: From Parallelism extraction to code generation," Parallel Computing vol. 24, 1998, pp. 421-444.

Gupta et al., "Techniques for speculative run-time parallelization of loops," In: the 1998 ACM/IEEE conference on Supercomputing, 1998, pp. 1-12.

Knobe et al., "Array SSA Form and its use in parallelization," In: the 25th ACM SIGPLAN-SIGACT Symposium on Principles of progaimming languages, 1998, pp. 107-120.

International Search Report and Written Opinion Received for PCT Application No. PCT/US2011/065948, mailed on Jul. 18, 2012, 11 pages.

Hank, et al., "Region-Based Compilation: An Introduction and Motivation," International Journal of Parallel Programming, 25(2):113-146, Apr. 1997, 11 pages.

Liu, et al., "A Region-Based Compilation Infrastructure," In Proceedings of the Seventh Workshop on Interaction between Compilers and Computer Architectures, 2003, pp. 1-10.

Ng, et al., "Inter-Procedural Loop Fusion, Array Contraction and Rotation," Proceedings of the 12th International Conference on Parallel Architectures and Compilation Techniques, (PACT'03), 2003 IEEE, 11 pages.

Office Action received for U.S. Appl. No. 12/976,463, mailed on Mar. 26, 2013, 8 pages.

Yu et al., "Algorithms and Architecture Support for Pipelining and Scheduling Nested Loops with Conditions", 1997, 22 pages.

International Preliminary Report on Patentability and Written Opinion received for PCT Application No. PCT/US2011/065948, mailed on Jul. 4, 2013, 7 pages.

Notice of Allowance received for U.S. Appl. No. 12/976,463, mailed on Jul. 9, 2013, 9 pages.

Barton et al., Generalized Index-Set Splitting 2005, pp. 106-120.

Dz-Ching Ju et al., A Unified Compiler Framework for Control and Data Speculation, IEEE PACT 2000, pp. 157-168.

Lin et al., A Compiler Framework for Speculative Analysis and Optimizations, PLDI 2003, pp. 289-299.

Griebl et al., Index Set Splitting, IJPP 28(6) 2000, pp. 607-631.

Ghodrat et al., Control Flow Optimization in Loops Using Interval Analysis, CASES 2008, pp. 157-166.

Zhu et al., A Scheme to Enforce Data Dependence on Large Multiprocessor Systems, IEEE Transaction Software Engineering 13(6) 1987, pp. 726-739.

Saltz et al., Run-Time Parallelization and Scheduling Loops, IEEE Transactions on Computers 40(5) 1991, pp. 603-612.

Leung et al., Improving the Performance of Run-Time Parallelization, Proc. ACM PPoPP 1997, pp. 83-91.

Midkiff et al. Compiler Algorithms for Synchronization, IEEE Transactions on Computers 36(12) 1987, pp. 1485-1495.

Rauchwerger et al., The Privatizing DOALL Test: A Run-Time Technique for DOALL Loop Identification and Array Privatization, Proc. ACM ICS-94 Int. Conf. on Supercomputing Jul. 1994, pp. 33-45.

Rauchwerger et al., The LRPD Test: Speculative Run-Time Parallelization of Loops with Privatization and Reduction Parallelization, Proc. ACM SIGPLAN PLDI-95 1995, pp. 218-232.

Warg et al., Limits on Speculative Module-Level Parallelism in Imperative and Object-Oriented Programs on CMP Platforms, Pr. IEEE Pact 2001.

Marcuello et al., Thread-Spawning Schemes for Speculative Multithreading, Proc HPCA-8 2002.

Warg et al., Improving Speculative Thread-Level Parallelism Through Module Run-Length Predicition, Proc. IPDPS 2003.

Ohsawa et al., Pinot: Speculative Multi-Threading Processor Architecture Exploiting Parallelism Over a Wide Range of Granularities, Proc. MICRO-38 2005.

Office Action received for Taiwan Patent Application No. 100147402, mailed on Feb. 13, 2014, 11 pages of English Translation and 12 pages of Taiwan Office Action.

\* cited by examiner

| for (i=0;i<n;i++) { | mis_speculation_flag = FALSE; | if (!mis_speculation_flag) { |
|---|---|---|
| if (!a[i]) { | for (i=0;i<n;i++) { | // version 1 |
| return; | if (!a[i]) { | L1: //speculative loop placeholder label |
| } | mis_speculation_flag = TRUE; | for (i=0;i<n;i++) { |
| .... | } | .... |
| } | } | } |
| | if (!mis_speculation_flag) { | } |
| | /* version 1 */ | else { |
| | for (i=0;i<n;i++) { | // version 2 |
| | .... | // original loop |
| | } | for (i=0;i<n;i++) { |
| | } | .... |
| | else { | if (!a[i]) { |
| | /* version 2 */ | return; |
| | for (i=0;i<n;i++) { | } |
| | // original loop | .... |
| | .... | } |
| | if (!a[i]) { | } |
| | return; | |
| | } | |
| | .... | |
| | } | |
| | } | |
| (a) source code | (b) Output after traditional loop multi-versioning | (c) Output after speculative version loop placeholder generation |

FIG. 2

| for (i=0;i<n;i++) { | if (!mis_speculation_flag) { | for (i=0;i<n;i++) { | if (!mis_speculation_flag) { |
|---|---|---|---|
| if (!a[i] ) { | for (i=0;i<n;i++) { | if (!a[i]) { | for (i=0;i<n;i++) { |
| error_print(); | ctrl_gurad_false(a[i]); | continue; | ctrl_guard_maybe_false (a[i]); |
| return; | if (0) { | } | if (0) { |
| } | error_print(); | j = j+1; | continue; |
| .... | return; | b[j]=...; | } |
| } | } | .... | j = j+1; |
| | .... | } | b[j]=...; |
| | } | | .... |
| | } | | } |
| | else { | | } |
| | for (i=0;i<n;i++) { | | else { |
| | if (!a[i]) { | | for (i=0;i<n;i++) { |
| | error_print(); | | if (!a[i]) { |
| | return; | | continue; |
| | } | | } |
| | .... | | j = j+1; |
| | } | | b[j]=...; |
| | } | | .... |
| | | | } |
| | | | } |
| (a) source code | (b) Generation of speculation guard for control speculation which is required to be successful for every iteartion | (c) source code | (d) Generation of speculation guard for control speculation which allows small number of mis-speculation |

FIG. 3

| | |
|---|---|
| for (i=0;i<n;i++) {<br>a[i] = ...<br>... = a[b[i]]<br>...<br>} | if (!mis_speculation_flag) {<br>  for (i=0;i<n;i++) {<br>    a[i] = ...<br>    a[b[i]] = data_guard_ maybe_false(a[i])<br>    ... = a[b[i]]<br>    ...<br>  }<br>}<br>else {<br>  for (i=0;i<n;i++) {<br>    a[i] = ...<br>    ... = a[b[i]]<br>    ...<br>  }<br>} |
| (a) source code | (b) Generation of speculation guard for control speculation which is required to be successful for every iteration |
| for (i=0;i<n;i++) {<br>  a[b[i]] = a[b[i]] + e[i];<br>  c[d[i]] = c[d[i]] + 2<br>....<br>} | if (!mis_speculation_flag) {<br>  for (i=0;i<n;i++) {<br>    e[i] = data_guard_false(a[b[i]]);<br>    a[b[i]] = a[b[i]] + e[i];<br>    c[d[i]] = data_guard_false(a[b[i]]);<br>    c[d[i]] = c[d[i]] + 2<br>    ....<br>  }<br>}<br>else {<br>  for (i=0;i<n;i++) {<br>    a[b[i]] = a[b[i]] + e[i];<br>    c[d[i]] = c[d[i]] + 2<br>    ....<br>  }<br>} |
| (c) source code | (d) Generation of speculation guard for control speculation which allows small number of mis-speculation |

FIG. 4

```
for each speculation guard s in the loop {
    if s is in the form of ctrl_guard_false(exp_x), where exp_x is an array reference like a[i]
        generate the inspection loop as shown in Figure 9 (a)
    else if s is in the form of ctrl_gurad_maybe_false(exp_x), where exp_x is an array reference like a[i]
        generate the inspection loop as shown in Figure 9 (b)
    else if s is in the form of exp_b = data_guard_maybe_false(exp_x), where exp_x is an array reference like a[i] and
    exp_b is an array reference like a[b[i]]
        generate the inspection loop as shown in Figure 9 (c)
    else { // s is in the form of exp_y = data_guard_false(exp_x)
        succ_red_flag = TRUE;
        if (exp_x is in the form of indirect array reference) {
            for each dependence edge for expression exp_x in the form of (t, s), where t is a stmt
                if the statement t is not marked as sparse array reduction {
                    succ_red_flag = FALSE;
                    break;
                }
        }
        if (exp_y is in the form of indirect array reference) {
            for each dependence edge for expression exp_y in the form of (t, s), where t is a stmt
                if the statement t is not marked as sparse array reduction {
                    succ_red_flag = FALSE;
                    break;
                }
        }
        if (succ_red_flag == FALSE) {
            set the condition expression of two versions loop to be FALSE so that the speculative version will be removed
            as dead code later;
            break;
        }
        if (exp_x in an indirect array reference like a[b[i]] && exp_y is an array reference like c[i]) {
            generate the inspection loop as shown in Figure 9 (d)
        }
        if (exp_x in an indirect array reference like a[b[i]] && exp_y is an indirect array reference like c[d[i]]) {
            generate the inspection loop as shown in Figure 9 (e)
        }
    }
}
```

FIG. 5

```
mis_speculation_flag = FALSE;
for (i=0;i<n;i++) {
  if (!a[i]) {
    mis_speculation_flag = TRUE;
    break;
  }
}

(a) Example of inspection loop generation for
speculation guard ctrl_false (a[i])
```

```
int mis_speculation_table[n];
int mis_count=0;
mis_speculation_table[1:n] = 0;
for (i=0;i<n;i++) {
  if (!a[i]) {
    mis_speculation_table[i] = 1;
    mis_count++;
  }
}
if (mis_count ==0){
  mis_speculation_flag = FALSE;
}

(b) Example of inspection loop generation for
speculation guard ctrl_maybe_false (a[i])
```

```
int addr_table[0:255] = 0;
int lower_a, upper_a;
lower_a = upper_a = b[0];
for (j=0;j<n;j++) {
  addr_table[ hash_func(&a[b[j]])] = 1;
  lower_a = min(lower_a, b[j]);
  upper_a = max(upper_a, b[j]);
} int mis_speculation_table[n];
int mis_count=0;
mis_speculation_table[1:n] = 0;
for (i=0;i<n;i++) {
  if (i>=lower_a && i<=upper_a &&
      addr_table[ hash_func(&a[i])] == 1) {
    mis_speculation_table[i] = 1;
    mis_count ++;
  }
}
if (mis_count ==0){
  mis_speculation_flag = FALSE;
}

(c) Example of inspection loop generation for
speculation guard a[b[i]]=data_maybe_false
(a[i])
```

```
int lower_a, upper_a;
lower_a = upper_a = b[0];
for (i=1;i<n;i++) {
  lower_a = min (lower_a, b[i]);
  upper_a = max(upper_a, b[i]);
}
mis_speculation_flag = FALSE;
if (a[lower_a:upper_a] overlaps with c[1:n]) {
  mis_speculation_flag = TRUE;
}

(d) Example of inspection loop generation for
speculation guard c[i]=data_false (a[b[i]])
```

```
mis_speculation_flag = FALSE;
if (a ^ c & (align-1) != 0) {
  mis_speculation_flag = TRUE;
}

(e) Example of inspection loop generation for
speculation guard c[d[i]]=data_false (a[b[i]])
```

*FIG. 6*

```
if (!mis_speculation_flag) {
    // version 1 : // if speculation successful
    for (i=0;i<n;i++) {
        ...
    }
}
else if (mis_count <T) {
    // version 3: for small mis-speculation
    for (i=0;i<n;i++) {
        ...
    }
    //To be applied with loop splitting
}
else {
    // version 2: original version
    for (i=0;i<n;i++) {
        ...
    }
}
```

FIG. 7

```
#define func1(s, length) \
for (int j=s;j<s+length;j++) {\
    /* speculative version */ \
    ...
} define func2(s,length) \
for (int j=s;j<s+length;j++) {\
    /* original version */ \
    ...
} start = 0;
good = 0;
bad = 0;
for (i=0;i<n;i++) {
    if (mis_speculation_table[i] {
        if (good > 0) {
            if (good <T1) {
                bad += good;
            ...
            else {
                if (bad >0) {
                    func1( start, bad);
                    func2( start+bad, good);
                }
                else {
                    func2( start, good);
                }
            }
        }
        start = i;
        good = 0;
        bad++;
        if (n==i-1) {
            func1(start, bad);
        }
    }
    else {
        good++;
        if (n==i-1) {
            if (good<T1) {
                bad += good;
                func1(start, bad);
            }
            else {
                if (bad>0) {
                    func1( start, bad);
                    func2( start+bad, good);
                }
                else {
                    func2( start, good);
                }
            }
        }
    }
}
```

FIG. 8

LOOP PARALLELIZATION BASED ON LOOP SPLITTING OR INDEX ARRAY

The present disclosure generally relates to the field of computing. More particularly, an embodiment of the invention generally relates to loop parallelization based on loop splitting and/or index array.

BACKGROUND

One way to increase computing speed is to utilize parallelism. Large real world applications with irregular control flow or data flow pose challenges on the progressive improvement of the state-of-the-art optimizing compilers, as these irregular control flow and data flow may often not be compile-time analyzable. This may in turn inhibit or reduce important loop optimizations such as parallelization and vectorization.

Conventional wisdom on parallelizing loops with such irregular control flow and/or data flow has mainly focused on eliminating or reducing the loop carried control flow or data flow dependencies. Accordingly, the issue on how to effectively enable both control and data speculation for general loop optimizations such as parallelization, vectorization, loop distribution, and fusion remains open.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

FIGS. 2-8 illustrate sample pseudo code, according to some embodiments.

DETAILED DESCRIPTION

Figure 1:
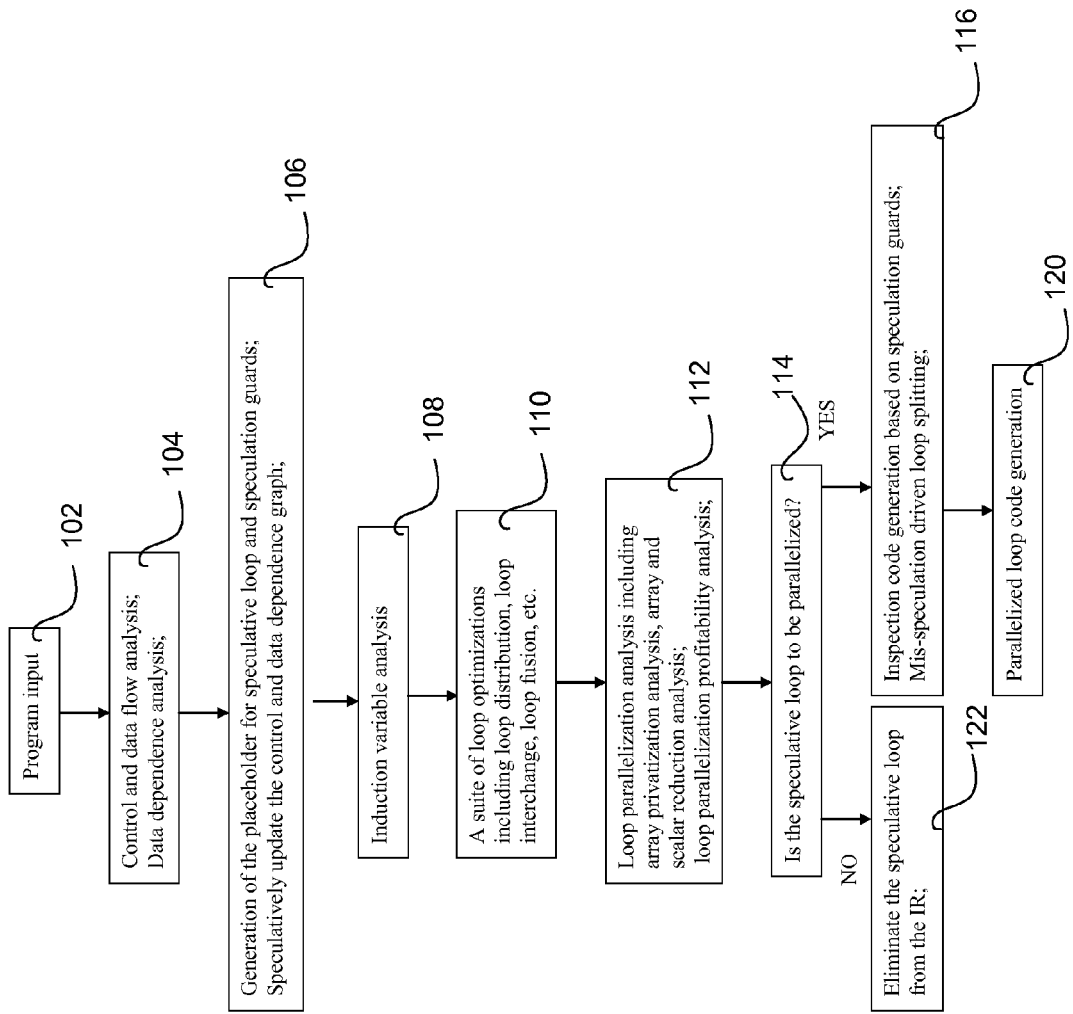
FIG. 1 illustrates a flow diagram, according to an embodiment.

In the following description, numerous specific details are set forth in order to provide a thorough understanding of various embodiments. However, various embodiments of the invention may be practiced without the specific details. In other instances, well-known methods, procedures, components, and circuits have not been described in detail so as not to obscure the particular embodiments of the invention. Further, various aspects of embodiments of the invention may be performed using various means, such as integrated semiconductor circuits ("hardware"), computer-readable instructions organized into one or more programs ("software"), or some combination of hardware and software. For the purposes of this disclosure reference to "logic" shall mean either hardware, software (including for example micro-code that controls the operations of a processor), or some combination thereof.

Some embodiments discussed herein may provide loop parallelization based on loop splitting and/or index array. As discussed above, the issue on how to effectively enable both control and data speculation for general loop optimizations such as parallelization, vectorization, loop distribution, and fusion remains open. To this end, loop parallelization may be achieved based on loop splitting in an embodiment. In some embodiments, the compiler framework may be extended to unify control and data speculation that enables more loop optimizations, especially parallelization. Also, loop splitting techniques (e.g., based on mis-speculation driven loop splitting) may allow for more loops being speculatively optimized. Furthermore, a (lazy) inspection code generation scheme may enable the later analysis and optimizations without requiring any change to accommodate the speculative information.

Additionally, to improve speed some processors may utilize multiple/many processing cores. Generally, in order to take advantage of multi/many core architectures, the code has to execute in parallel. Writing parallel programs may be a difficult task and, as a result, programs/applications are generally serial in nature. For loops with no data dependencies, auto-parallelizing may be used for sections of the code which may be profitably parallelized. This is usually true for loops with no data dependences. Auto-parallelizing loops with data/control dependences is a difficult problem.

In one embodiment, the problem of auto-parallelizing loops with certain types of data/control dependences that are commonly encountered may be solved based on an index array. In some embodiments, an index array may be generated (e.g., by a compiler) and used to partition (and possibly reorder) the iteration space in order to parallelize/optimize loops. For example, data/control flow analysis (as well as the code transformation) may be done at compile time, while the values of the iteration subspaces are generated at runtime (e.g., through a pre-computation loop). This provides a generic technique to break control/data flow dependences and enable more loop optimizations, such as parallelization. No profile information is needed in an embodiment, though one may be used for efficiency. Accordingly, an embodiment may use software only run-time checking and not require any special hardware support.

Generally, current implementation can not be easily applied for the loops containing irregular control and/or data flow. For example, consider the following hot loop extracted from the industry standard benchmarks SPEC CPU2006/454.calculix:

```
for (i=0;i<n;i++) {
    if (!f[i]) return;
    a[b[i]] = a[b[i]] + sum[i];
    c[d[i]] = c[d[i]] + sum[i];
    ....
}
```

The above loop may not be parallelized since the compiler analysis assumes that pointer a, c and sum point to the same point-to set and the branch inside the loop may be taken. However, if the dependence among expression *a, *c and *sum may be speculatively ignored and the condition expression !f[i] is assumed to be always FALSE, the loop will be parallelized. Hence, the compiler may generate two versions loop, one parallelized version and one sequential version. In order to guarantee the correctness of program at run-time, an inspection loop is generated to determine whether those pointers are aliased, as well as whether the branch is taken. If the expressions are proved to be independent and the branch is never taken at run-time, the parallelized version will be executed instead of the sequential version.

FIG. 1 illustrates a flow diagram for a framework of speculative loop parallelization, in accordance with an embodiment. In an embodiment, an extended compiler framework supports both control and data speculation to enable relatively aggressive loop optimizations, e.g., using a software speculation approach.

Moreover, the loop parallelization may be divided into two phases: the analysis phase and the transformation phase. The analysis phase identifies loop parallelization opportunities based on control and data dependence information. If a loop is determined to parallelizable and profitable for parallelization, the transformation modifies the Internal Representation (IR) to generate parallelized code. As discussed herein, a loop is considered to be profitable for parallelization if parallelizing the loop would result in speed up (e.g., shorter execution period).

Referring to FIG. 1, the compiler framework includes the following operations. After program input at operation 102, the compiler identifies/selects a loop (nest) which is determined to be profitable for speculative parallelization by analyzing control and data (dependence) information, e.g., based on compiler analysis of optimization heuristics and/or profiling information, at an operation 104. At an operation 106, the compiler generates a speculative loop placeholder for the selected/identified loop nest at early compiler phase. In an embodiment, the compiler uses the heuristic rules and/or profiling information to (e.g., speculatively) update the control and data dependence graph for the speculative placeholder by eliminating one or more highly unlikely taken branches to restructure the program and ignoring low probability data dependence from optimizations.

In an embodiment (e.g., at operation 106), the compiler generates one or more speculation guards to preserve the speculation information which in turn may be used to facilitate the generation of the inspection code. In one embodiment, the later phase compiler analyses and transformations are then applied without any change to accommodate speculative information through speculation guards. At an operation 108, the compiler performs induction variable analysis, which may be used to find all the induction variables in each loop and perform the needed transformation and substitution. At an operation 110, a suite of loop optimization techniques may be used including loop distribution, loop interchange, loop fusion, etc.

At an operation 112, the compiler evaluates/determines whether the targeted loop (e.g., selected/identified loop at operation 104) is profitable to generate the inspection code. If it is profitable (as determined at operation 114), the run-time inspection code based on speculation guards is generated (and executed) at an operation 116, e.g., to collect/determine unified mis-speculation information for both control and data speculation. In an embodiment, the speculation and/or mis-speculation information is used to update the control expression for speculative placeholder. In some embodiments, the compiler further generates one or more split loops (corresponding to the selected/identified loop of operation 104) for the case of a small number of mis-speculations, e.g., as compared with a threshold value. The split loops (which may achieve the results to be derived by executing the selected/identified loop) may have disjoint index set, fewer branches, and/or fewer loop carried dependencies when compared with the original selected/identified loop. The loops which do not have mis-speculation at run-time are thus parallelized safely at an operation 120. The compiler selects a loop (nest) which is profitable for speculative parallelization based on the profiling and or simple compiler heuristics. If the loop targeted for the speculative placeholder is not considered to be parallelized, it will be eliminated as the dead code at an operation 122.

In some embodiments, one or more of the following may be utilized to provide efficient parallelism: (A) a scheme of (lazy) inspection code generation; (B) a speculation guards based inspection code generation pseudo code (e.g., where the compiler generated inspection code is used to collect unified mis-speculation information for both data and control speculation); and (C) mis-speculation driven loop splitting based on the unified mis-speculation information for the case of small number of mis-speculations.

With respect to the lazy inspection code generation, the traditional loop multi-versioning technique may rely on a single compiler phase to generate multiple versions of the loop, the inspection code, and the branch checking code that selects either the original loop or the optimized loop to be executed at run-time. FIG. 2 shows an example of a two loop versions, labeled as loop (b) and loop (c), for the loop (a), in accordance with some embodiments. In an embodiment, the code generation of the multi-versions loop and the inspection code are decoupled and performed at different compiler phases. The inspection code may be generated only when the speculative loop version may be parallelized and it is profitable to generate the inspection code, e.g., as discussed with reference to FIG. 1/ If the inspection code is generated early, those generated code might increase the compile time and inhibit later analyses and optimizations.

Given a loop which is determined to be profitable for speculative parallelization, e.g., based on the profiling and compiler heuristics, the compiler generates the two versions loop at early compiler phase, where one version is speculative loop placeholder (e.g., loop (c)) and the other version is the original version (e.g., loop (b)). The control and data speculation may be used to update the control and data dependence for the speculative version. At the same time, speculation guards may be introduced to preserve the speculation information. If the speculative version is determines to be parallelized later, the compiler generates the inspection code before the transformation takes place. Otherwise, the speculative version is eliminated as dead code.

In an embodiment, speculative loop placeholder generation with the semantics of software speculation based loop parallelization, e.g., as a if-then-else control flow structure, is shown in FIG. 2 loop (c). The if condition checks whether the speculation is successful or not. If it is successful, the speculative version will be executed. Otherwise, the original version will be executed. Since mis-speculation has to be rare to make speculation worthwhile, the if condition is set to be highly likely to happen. Based on such an explicit representation, later analyses and optimizations could treat it as any other highly biased if-blocks. There will be no need to distinguish speculative code from non-speculative code during the analyses and the optimizations.

With respect to the speculation guard generation, in the compiler analysis, control speculation may be supported by examining program control structures and estimating likely execution paths based on edge/path profiling and heuristic rules. The optimization that try to incorporate control speculation may be modified and made aware of such annotate control speculative information. Also, the data speculative information may be explicitly annotated either through speculative dependence edges in dependence graph or speculative weak update. Optimizations that try to incorporate data speculation may be modified to handle the annotated speculation information.

In an embodiment, the control speculative information is integrated into control flow graph by assuming the highly unlikely taken branches to be false, eliminating those branches and restructuring the control flow graph. The probability for the branches may be obtained through edge/path profiling and/or compiler heuristics in some embodiments. Static estimation of the probabilities for branches may be performed by a set of predicting heuristics that recognize frequently met constructs in the control flow graph of the program. For instance, for each branch, such a heuristic either predicts that a branch is highly likely taken (not taken) or simply gives up. In one instance, loop branches are predicted taken, since the loop continuation is more probable than exit from it. The other branches may be estimated based on the set of heuristics; for example, whether the control block to which control is transferred contains a function call, etc. If the majority of heuristics do not work, the branch prediction may be close to 90/50, which does not provide grounds to select one or another way of execution. The edge/path profile could also be used to provide such probabilistic information. Assume that the condition expression of the branch handled is loop variant in the form of non-linear array expression. In order to generate the inspection code later, this condition expression has no loop carried data dependence in some embodiments. If the condition expression is linear or loop invariant, it may be treated as an extreme case.

The two simple heuristics rules used in some embodiments are as follows. (1) the branch whose body contains exceptional control flow statements including "return", "abort", "exit", or "break" is identified as highly unlikely to be taken; or (2) the branch whose body contains only the statement "continue" is identified as highly unlikely to be taken.

Since the inspection code may be generated much later at the compiler phase, it is not trivial to generate the inspection code since the loop may be applied with a suite of loop optimizations, including loop interchange, loop distribution, etc. To this end, the speculation guard may be introduced to preserve the speculation information. Since the loop parallelization requires the speculation in case 1 above should be successful for every iteration while allows small number of mis-speculations in case 2 above, two kinds of speculation guards are introduced corresponding to these two cases. In FIG. 3($a$), the loop variant branch condition !a[i] inside the loop inhibits the loop parallelization. Eliminating this branch speculatively may make the loop parallelizable. Since the condition !a[i] is highly likely to be FALSE, the compiler replaces the if condition with 0 and inserts the speculation guard ctrl_guard_false to indicate that this speculation needs to be successful for every iteration. The parameter a[i] of the speculation guard may help the compiler to generate the inspection code easily. FIG. 3($c$) shows a different scenario where small number of mis-speculations is allowed.

In one embodiment, another speculation guard ctrl_guard_maybe_false is introduced to correspond to this case as shown in FIG. 3($d$). Also, data speculation may be incorporated into the speculative data dependence analysis by ignoring the low probability loop carried data dependence from optimizations. The probabilistic of data dependence edges may also be obtained by data dependence profiling or compiler heuristics. Some simple compiler heuristic rules are used to identify highly unlikely dependent memory references.

For example, the loop carried dependence in the following four cases may be ignored in some embodiments. Given a loop nest starting with the loop index i1, the linear array subscript is in the form of a1*i1+a2*i2+ . . . +an*in, where i1, i2, . . . , in is loop index variable and a1 is not equal to 0.

Case 1: The loop carried dependence edge between the store which has linear array subscript and the load which has non-linear array subscript;

Case 2: The loop carried dependence edge between the store which has non linear array subscript and the load which has linear array subscript;

Case 3: The loop carried dependence edge between the store which has non linear array subscript and the load which has non-linear array subscript;

Case 4: The loop carried dependence edge between the store which has non linear array subscript and the other store which has non-linear array subscript.

In some embodiments, loop parallelization utilizes the data speculation to be successful for every iteration for cases 2, 3, and 4 and allows small number of mis-speculations for case 1. Speculation guard may be used for different cases so that the run-time inspection code may be generated in a more straightforward fashion. The generated speculation guards may be specially handled in the data dependence analysis as well as array reduction analysis. For example, the data dependence analysis changes all the loop carried data dependence involving the speculation guard to loop independent dependence. The array reduction analysis may ignore all the edges involving the speculation guard so that the reduction candidate may be recognized effectively.

FIG. 4($a$) shows a loop where the expression a[i] is unlikely overlapped with the expression a[b[i]]. In one embodiment, the compiler removes the corresponding loop carried dependence edge and inserts the new intrinsic a[b[i]]=data_guard_maybe_false(a[i]). FIG. 4($c$) shows a loop where the expression a[b[i]] is aliased with the expression c[i]. This low probability dependence may be ignored thus the expression a[b[i]] is recognized as array reduction candidate and the loop may be parallelized. In the lazy inspection code generation, the compiler inserts the speculation guard data_guard_false to indicate that the speculation should be successful for every loop iteration. In FIG. 4($c$) the expression a[b[i]] and c[d[i]] are recognized as array reduction candidates after the dependence edge between these two expressions are speculatively ignored.

With respect to speculation guard based inspection code generation, since the compiler generates the two versions loop early at compiler phase, more loop parallelization opportunities could be exposed by existing loop analyses and optimizations without requiring any change to accommodate such speculative information. If the speculative version cannot be speculatively parallelized, the compiler may simply remove it as dead code. Otherwise, the compiler generates the inspection code for each speculation guard in order to guarantee the correctness of the speculatively parallelized loop. The speculation guards is in turn removed from the IR after the inspection code is generated. The mis-speculation information collected by the inspection code at run-time may be used to select the right version to be executed. In an embodiment, unified mis-speculation information is used to model both control and data speculation. If speculation is required to be successful for every iteration, one mis-speculation flag may be to represent the mis-speculation information. Otherwise, a mis-speculation table may be used to handle the case of small number of mis-speculations, where the size of mis-speculation table is equal to the loop trip count and the value of each element of the mis-speculation table indicates whether the speculation is successful for the corresponding iteration.

FIG. 5 shows an pseudo code on how to generate the inspection code, e.g., based on the speculation guard, according to an embodiment. FIG. 6 lists the examples on how to generate the inspection code for different speculation guard, according to an embodiment. The violated control dependence is represented as the speculation guard ctrl_guard_false or ctrl_guard_maybe_false in the compiler IR (Intermediate Representation). In FIG. 6($a$), the speculation guard ctrl_guard_false (a[i]) assumes that the expression !a[i]

is false for every iteration. In the inspection loop generation, the mis-speculation flag is constructed to select the parallelized version if the speculation is always successful. FIG. 6(b) shows an example of the inspection loop generation for speculation guard ctrl_guard_maybe_false(a[i]), where a mis-speculation table is constructed to records the iteration where the mis-speculation happens. The compiler may also construct a counter mis_count to record the number of mis-speculations. The mis-speculation for speculation guard ctrl_guard_maybe_false(a[i]) is the condition expression a[i] is false. A similar mechanism may be applied for the violated data dependence.

In FIG. 6(c), the speculation guard a[b[i]]=data_guard_maybe_false (a[i]) assumes that the array reference a[i] and a[b[i]] are unlikely dependent. The mis-speculation for iteration i refers to the case that a[i] and a[b[j]] access to the same memory address, where the expression condition 0<=i,j<n holds. In order to collect the mis-speculation information efficiently, the compiler constructs the 256 entries address table in one embodiment, e.g., where the address &a[b[j]] is used as a key to map into one of the entries in the address table. Then, a loop is constructed to detect whether &a[i] maps to some entry which has been mapped by some address &a[b[j]]. If the same entry of the address table is mapped by the address &a[i] and &a[b[j]], the iteration i is denoted as having mis-speculation. The corresponding element of the mis-speculation table may be set to be true.

Moreover, the speculation guard e[i]=data_guard_false (a[b[i]]) in FIG. 6(d) assumes that the expression a[b[i]] is unlikely to be aliased with the expression e[i]. Since the expression a[b[i]] is a store operation, the compiler may check whether all the store statement(s) in the form of a[b[i]]= . . . are marked as sparse array reduction. If not, the compiler resets the condition expression for multi-version loop and the loop parallelization will give up for that loop, according to some embodiments. Otherwise, the compiler generates a loop to collect the bound information for the reference a[b[i]]]. The array bound information for the reference c[i] may be derived from the loop lower bound and upper bound. The mis-speculation flag is set to TRUE if the array section a and e overlap with each other.

FIG. 6(e) shows another case where the expression a[b[i]] is assumed to be aliased with c[d[i]] by compiler analysis, according to an embodiment. If the sparse array reduction analysis detects that both expression a[b[i]] and c[d[i]] are array reduction candidates, the compiler may simply check whether their alignment are the same in the inspection code generation instead of generating a loop to detect whether the array sections are overlapped with each other or not. It then updates the mis-speculation flag so that the speculative parallelization code may be executed if the speculation is successful.

With respect to mis-speculation driven loop splitting, when the speculative version is determined to be parallelized and small number of mis-speculations is allowed, the compiler generates the third version for further loop splitting as shown in FIG. 7, according to an embodiment. The compiler assumes speculative loop parallelization is profitable if the number of mis-speculation is below some threshold T. Since the value of each element of mis-speculation table indicates whether the speculation is successful for the corresponding iteration, the loop may be simply split based on a mis-speculation table. In an embodiment, the loop is split into multiple disjoint loops which have smaller index set. The smaller loops which have no mis-speculation at run-time are thus parallelized safely. According to one embodiment, FIG. 8 shows how the compiler generates the code to split the loop (version 3) in FIG. 7. In FIG. 8, the compiler constructs a loop to traverse each element of mis-speculation table and computes the interval which has no mis-speculation. If an interval which has no mis-speculation and the interval length is larger than some threshold T1, the loop for the corresponding index set may be speculatively parallelized. Thus, the compiler constructs a smaller loop func1 as shown in FIG. 8 with the index set and duplicates the loop body from version 1 (speculative version). Otherwise, the compiler duplicates the loop body from version 2 (original version) for this smaller loop func2 as shown in FIG. 8.

With respect to loop optimization based on an index array, an embodiment utilizes a new approach to break control and data flow dependences in loops, e.g., creating more opportunities for loop optimization or auto-parallelization. As discussed herein, an index array is a subset of the iteration space of a loop constructed by selecting an iteration set that possesses one of the following two properties: (1) an IF-condition in the loop is always TRUE for the given iteration set and no other, or (2) a flow or anti-flow dependency edge in the loop exists for the given iteration set and no other. Moreover, an index array constructed for iterations that possess property 1 helps in breaking control flow dependency in the loop, while that constructed for iterations that possess property 2 helps in breaking data flow dependency in the loop. In both cases, the original loop may be transformed into two or more loops (henceforth subloops) by partitioning (and possibly reordering) the iteration space based on the index array, such that one or more subloops may be parallelized. This in turn may allow for: (i) enabling more parallelization by breaking control flow and data flow dependences and/or aiding other loop optimizations as well, such as software pipelining and redundancy elimination, without requiring profile information, (ii) minimal runtime overhead, (iii) no special hardware support.

Since parallelization is generally prohibited by control or data flow dependences, some embodiments provide loop structures that are frequently encountered in real applications and benchmarks. For example, presence of IF conditions in loops creates control flow dependences and prohibits loop optimizations. The following a simplified version of a hot loop in spec2006/462.libquantum:

```
for(i=0, j=0; i<k; i++){ (LOOP 1 : demonstrating control flow
dependence)
    if(A[i] ! =0){
    ....
    j = j + 1;
    B[j] = C[i];
    ....
    }
}
```

This loop cannot be parallelized because (j=j+1; B[j]=C[i] . . . ) is control dependent on the condition (A[i] !=0). One way to overcome this issue is to use control/data flow speculation. However, control/data flow speculation is not generically applicable/profitable in some implementations—the if condition should be mostly TRUE or mostly FALSE (in many cases always TRUE or always FALSE) for the transformation to be applicable/beneficial. Also, it relies on profile information, which can be very limiting. However, the subset of the iteration space for which (A[i] !=0) is TRUE may be parallelizable. To this end, an embodiment attempts to identify and separate out that iteration subset.

With respect to data flow dependence prohibiting parallelization, the following is a simplified version of a hot loop in spec2006/482.sphinx3:

```
for(i=0; i < k; i++){ (LOOP 2: demonstrating data flow dependence)
    ....
    A[i] = ..
    .. = A[B[i]]
    ....
}
```

This loop cannot be parallelized because there is a data dependence edge between A[i] and A[B[i]]. Noting range(B[i])<=range(i), where range(k) is the set of values that k can take, the subset of the iteration space (range(i)-range(B[i])) is parallelizable. In one embodiment, an index array is used to identify and parallelize the iteration subset. The index array, e.g., aimed at breaking one or more control flow and data flow dependences in loops, is used to enable more parallelization. In one or more embodiments, the following items may be utilized:

I. Mechanism that constructs the index array for breaking control flow dependence when possible;

II. Mechanism that partitions (and possibly reorders) the loop iteration space (using index array) for breaking control flow dependence that results in creation of subloops;

III. Mechanism that constructs the index array for breaking data flow dependence when possible; and/or IV. Mechanism that partitions (and possibly reorders) the loop iteration space (using index array) for breaking data flow dependence that results in creation of subloops.

With respect to loop transformations obtained using Mechanisms I, II, III, IV, the following pseudo code is intended to present a high-level sketch of the approach, according to an embodiment, and, as such, skips numerous details and legality checks required in the actual implementation:

```
Control-And-Data-Flow-Analysis-For-Parallelization( ); // Finds
control and data flow dependences //prohibiting parallelization
    void index-array-based-transformation(loop){
        if((num_control_flow_dependence_sets(loop) == 1) &&
(TYPE(control_flow_dependence_set) == if_condition)){
// all control dependences are because of a single if-condition
            if((num_branches(if_cond) == 1 ||
            one_of_the_branches_is_an_exit)
&& if_cond_contains_index){
                generate_controlflow_indexarray_loop(if_cond,
tripcount(loop), &index_array); //Mechanism 1
                generate_controlflow_loop_transformation(loop,
index_array); // Mechanism 2
            }
        }else if((num_of_data_flow_dependences == 1) &&
(TYPE(data_flow_dependency) == indirect_array_reference)){ //
Dependence between A[i]
and A[B[i]], B is inner array
            generate_dataflow_indexarray_loop(inner_array, tripcount,
&index_array); // Mechanism 3
            generate_dataflow_loop_transformation(loop, index_array); //
Mechanism 4
        }
    }
```

The index array approach for control flow optimization may be triggered when an if-condition with a single branch, such that the predicate of the if-condition depends on the loop index variable, is found to be responsible for the control dependences.

In an embodiment, mechanism 1 (generate_controlflow_indexarray_loop(if_cond, tripcount(loop), &index_array)) generates the following pre-computation loop for construction of index_array:

```
int index_array[tripcount];
int count = 0;
for(i=0; i < tripcount; i++){
    if(if_cond){
        index_array[count] = i;
        count++;
    }
}
```

Accordingly, index array may store the set of indic(es) for which the if-condition is TRUE. Since the set of iterations for which the if-condition evaluates to FALSE does not affect the computations inside the loop, it can be discarded. Only subset of the iteration space (as stored in the index array) needs to be iterated upon in an embodiment. This subsets is free of control dependences and may be parallelized.

In an embodiment, mechanism 2 (generate_controlflow_loop_transformation(loop, index_array)) creates a subloop out of the original loop by replacing one or more occurrences of index variable by the corresponding index array element, removing the if condition and replacing trip count by size of index array. The resulting subloop iterates over the elements of the index array (which is a subset of the original iteration space) and is free of control dependences.

In an embodiment, using the pseudo code (Mechanisms 1 and 2), LOOP 1 would be transformed into the following:

```
int index_array[k];
int count=0;
for(i=0; i < k; i++){ (Pre-computation Loop for Construction of Index array)
    if(A[i]){
        index_array[count] = i;
        count++;
    }
}
for(i=0; i < count; i++){ (Transformed LOOP1 -- parallelizable)
    ...
    B[i] = C[index_array[i]];
    ...
}
```

The index array approach for data flow optimization may be triggered when a data dependence between array accesses of the form A[i] and A[B[i]] is found to be prohibiting parallelization. B may be called the inner-array. B[i] is a subset of the iteration space of i. This is the subset of the iteration space for which data dependences exist. The remaining iterations may become free of data dependences and be parallelized. In turn, the index array may store values attained by B[i].

In an embodiment, mechanism 3 (generate_dataflow_indexarray_loop(inner_array, tripcount, &index_array)) generates the following two pre-computation loops for construction of index array:

```
index_array[0] = -1;
count = 1;
for(i=0; i < tripcount; i++){
    if(hash[inner_array[i]] == 0){
        hash[inner_array[i]] = 1;
    }
}
for(i=0; i < tripcount; i++){
    if(hash[i] == 1){
        index_array[count] = i;
        count++;
    }
}
index_array[count] = tripcount -1;
```

In an embodiment, mechanism 4 (generate_dataflow_loop_transformation(loop, index_array)) converts the original loop into a two-level loop nest, which may be perceived as a collection of parallelizable subloops. The outer loop iterates over the elements of the index array, while the inner loop iterates over the interval between two consecutive index array elements, which followed by a single iteration corresponding to the element of the index array. Every interval between two consecutive index array elements is free of data dependences and may be parallelized. Moreover, using the pseudo code (Mechanisms 3 and 4), LOOP 2 would be transformed into the following:

```
index_array[0] = -1; count = 1;
for(i=0; i < k; i++){ (Pre-computation Loops for Construction of
Index array)
        if(hash[B[i]] == 0){
            hash[B[i]] = 1;
        }
}
for(i=0; i < k; i++){
        if(hash[i] == 1){
            index_array[count] = i;
            count++;
        }
}
index_array[count] = tripcount -1;
for(i=0; i < count; i++){ (Transformed LOOP 2: inner loop is
parallelizable)
        for(j = index_array[i] + 1; j < index_array[i + 1]; j++) {
//parallelizable loop
            ....
            A[j] = ..
            .. = A[B[j]]
            ....
        }
        {
            ....
            A[j] = ..// single iteration
            ... = A[B[j]]
            ....
        }
}
```

Accordingly, some embodiments have minimal runtime overhead. In an embodiment, the index array based transformation may be guarded by a runtime check for loop tripcount. Only if the loop tripcount is higher than a certain threshold, is the transformed code executed. If the tripcount is known at compile time, then a compile time check may suffice. A runtime check on the size of the index array may be used to further improve the profitability of this approach. Also, if profile information is available, this approach may be applied only to hot loops.

Additionally, the pseudo code may be generalized to handle if-condition with two branches as well. For example, if the two branches do not have a data dependence edge between them, then the original loop may be distributed into two loops, one containing the if-condition and the body of the then-branch, and the other containing the complement of the if-condition and the body of the else-branch. The pseudo code as described herein may then be applied to the two loops separately to yield parallelizable subloops. The pseudo code may be further generalized to handle multiple if-conditions as well as multiple data dependencies within the same loop. This would involve the construction of multiple index arrays and a complicated transformation with possibly some noticeable runtime overheads.

Figure 9:
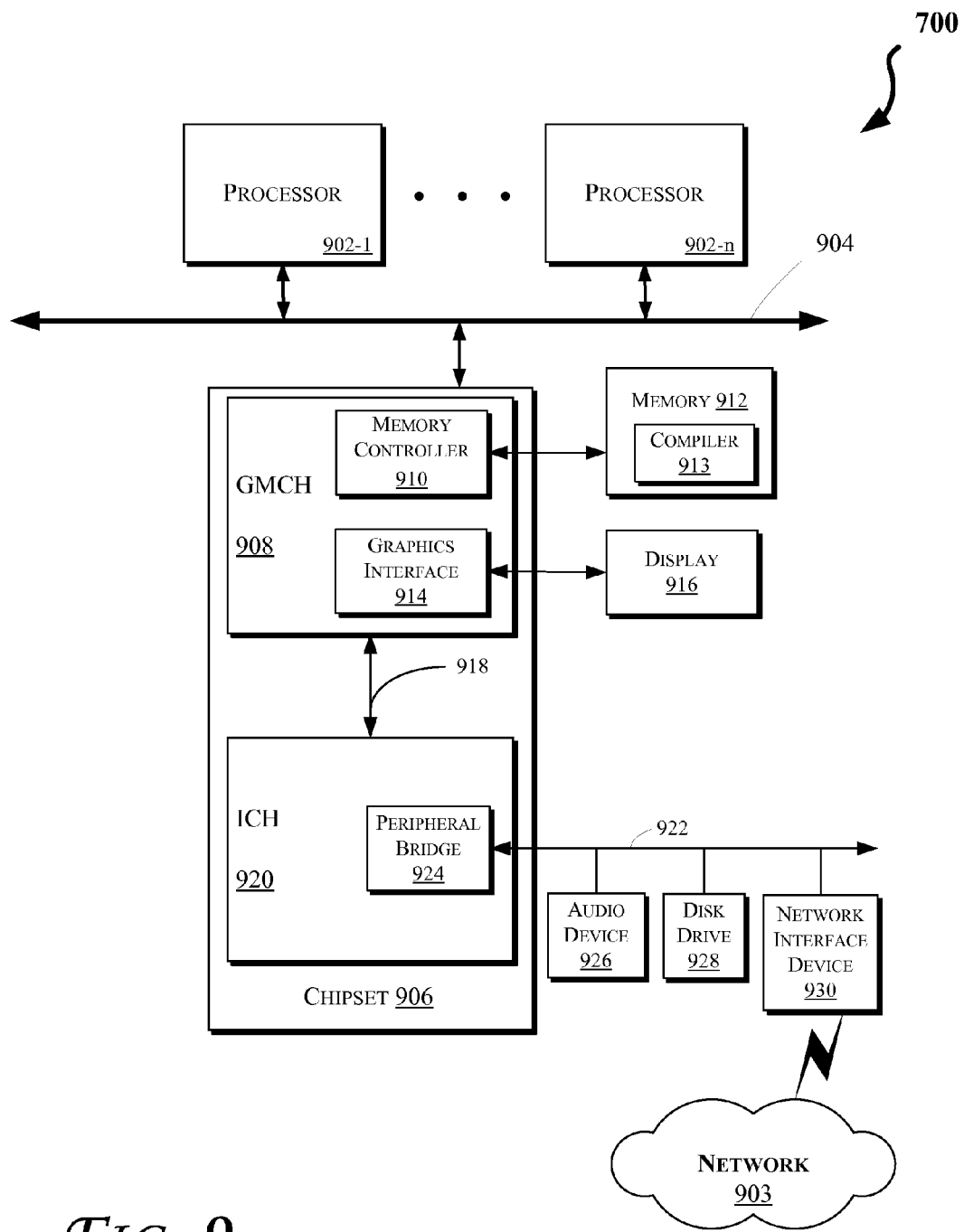
FIGS. 9 and 10 illustrate block diagrams of embodiments of computing systems, which may be utilized to implement some embodiments discussed herein.

FIG. 9 illustrates a block diagram of an embodiment of a computing system 900. In various embodiments, one or more of the components of the system 900 may be provided in various electronic devices capable of performing one or more of the operations discussed herein with reference to some embodiments of the invention. For example, one or more of the components of the system 900 may be used to perform the operations discussed with reference to FIGS. 1-8, e.g., by processing instructions, executing subroutines, etc. in accordance with the operations discussed herein. Also, various storage devices discussed herein (e.g., with reference to FIGS. 9 and/or 10) may be used to store data, operation results, etc.

More particularly, the computing system 900 may include one or more central processing unit(s) (CPUs) 902 or processors that communicate via an interconnection network (or bus) 904. Hence, various operations discussed herein may be performed by a CPU in some embodiments. Moreover, the processors 902 may include a general purpose processor, a network processor (that processes data communicated over a computer network 903), or other types of a processor (including a reduced instruction set computer (RISC) processor or a complex instruction set computer (CISC)). Moreover, the processors 902 may have a single or multiple core design. The processors 902 with a multiple core design may integrate different types of processor cores on the same integrated circuit (IC) die. Also, the processors 902 with a multiple core design may be implemented as symmetrical or asymmetrical multiprocessors. Moreover, the operations discussed with reference to FIGS. 1-8 may be performed by one or more components of the system 900.

A chipset 906 may also communicate with the interconnection network 904. The chipset 906 may include a graphics and memory control hub (GMCH) 908. The GMCH 908 may include a memory controller 910 that communicates with a memory 912. The memory 912 may store data, including sequences of instructions that are executed by the CPU 902, or any other device included in the computing system 900. In an embodiment, the memory 912 may store a compiler 913, which may be the same or similar to the compiler discussed with reference to FIGS. 1-8. Same or at least a portion of this data (including instructions) may be stored in disk drive 928 and/or one or more caches within processors 902. In one embodiment of the invention, the memory 912 may include one or more volatile storage (or memory) devices such as random access memory (RAM), dynamic RAM (DRAM), synchronous DRAM (SDRAM), static RAM (SRAM), or other types of storage devices. Nonvolatile memory may also be utilized such as a hard disk. Additional devices may communicate via the interconnection network 904, such as multiple CPUs and/or multiple system memories.

The GMCH 908 may also include a graphics interface 914 that communicates with a display 916. In one embodiment of the invention, the graphics interface 914 may communicate with the display 916 via an accelerated graphics port (AGP). In an embodiment of the invention, the display 916 may be a flat panel display that communicates with the graphics interface 914 through, for example, a signal converter that translates a digital representation of an image stored in a storage device such as video memory or system memory into display signals that are interpreted and displayed by the display 916. The display signals produced by the interface 914 may pass through various control devices before being interpreted by and subsequently displayed on the display 916. In some embodiments, the processors 902 and one or more other components (such as the memory controller 910, the graphics interface 914, the GMCH 908, the ICH 920, the peripheral bridge 924, the chipset 906, etc.) may be provided on the same IC die.

A hub interface 918 may allow the GMCH 908 and an input/output control hub (ICH) 920 to communicate. The ICH 920 may provide an interface to I/O devices that communicate with the computing system 900. The ICH 920 may communicate with a bus 922 through a peripheral bridge (or controller) 924, such as a peripheral component interconnect (PCI) bridge, a universal serial bus (USB) controller, or other types of peripheral bridges or controllers. The bridge 924 may provide a data path between the CPU 902 and peripheral devices. Other types of topologies may be utilized. Also, multiple buses may communicate with the ICH 920, e.g., through multiple bridges or controllers. Moreover, other peripherals in communication with the ICH 920 may include, in various embodiments of the invention, integrated drive electronics (IDE) or small computer system interface (SCSI) hard drive(s), USB port(s), a keyboard, a mouse, parallel port(s), serial port(s), floppy disk drive(s), digital output support (e.g., digital video interface (DVI)), or other devices.

The bus 922 may communicate with an audio device 926, one or more disk drive(s) 928, and a network interface device 930, which may be in communication with the computer network 903. In an embodiment, the device 930 may be a NIC capable of wireless communication. Other devices may communicate via the bus 922. Also, various components (such as the network interface device 930) may communicate with the GMCH 908 in some embodiments of the invention. In addition, the processor 902, the GMCH 908, and/or the graphics interface 914 may be combined to form a single chip.

Furthermore, the computing system 900 may include volatile and/or nonvolatile memory (or storage). For example, nonvolatile memory may include one or more of the following: read-only memory (ROM), programmable ROM (PROM), erasable PROM (EPROM), electrically EPROM (EEPROM), a disk drive (e.g., 928), a floppy disk, a compact disk ROM (CD-ROM), a digital versatile disk (DVD), flash memory, a magneto-optical disk, or other types of nonvolatile machine-readable media that are capable of storing electronic data (e.g., including instructions). In an embodiment, components of the system 900 may be arranged in a point-to-point (PtP) configuration such as discussed with reference to FIG. 10. For example, processors, memory, and/or input/output devices may be interconnected by a number of point-to-point interfaces.

Figure 10:
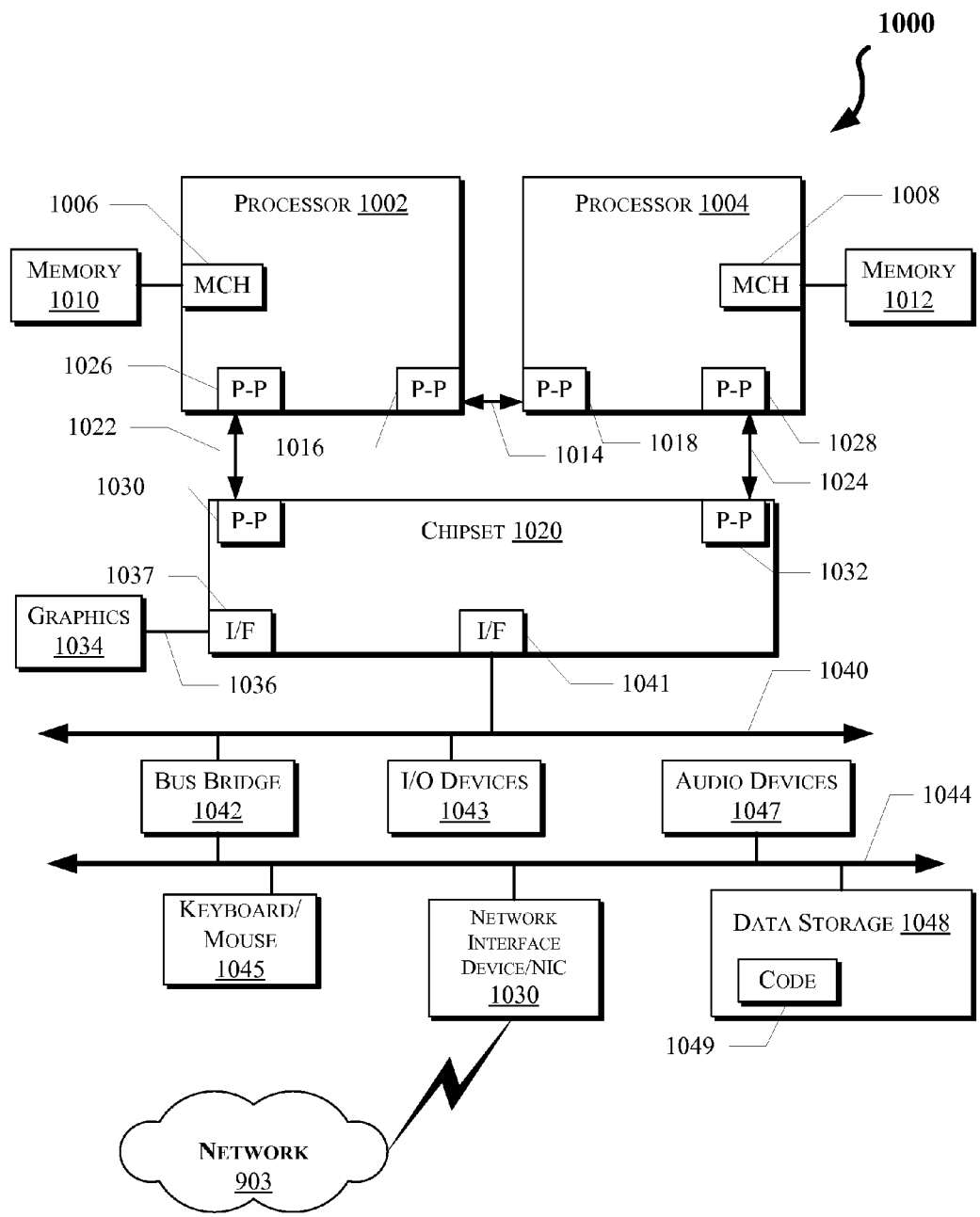

More specifically, FIG. 10 illustrates a computing system 1000 that is arranged in a point-to-point (PtP) configuration, according to an embodiment of the invention. In particular, FIG. 10 shows a system where processors, memory, and input/output devices are interconnected by a number of point-to-point interfaces. The operations discussed with reference to FIGS. 1-9 may be performed by one or more components of the system 1000.

As illustrated in FIG. 10, the system 1000 may include several processors, of which only two, processors 1002 and 1004 are shown for clarity. The processors 1002 and 1004 may each include a local memory controller hub (MCH) 1006 and 1008 (which may be the same or similar to the GMCH 908 of FIG. 9 in some embodiments) to couple with memories 1010 and 1012. The memories 1010 and/or 1012 may store various data such as those discussed with reference to the memory 912 of FIG. 9.

The processors 1002 and 1004 may be any suitable processor such as those discussed with reference to the processors 1002 of FIG. 10. The processors 1002 and 1004 may exchange data via a point-to-point (PtP) interface 1014 using PtP interface circuits 1016 and 1018, respectively. The processors 1002 and 1004 may each exchange data with a chipset 1020 via individual PtP interfaces 1022 and 1024 using point to point interface circuits 1026, 1028, 1030, and 1032. The chipset 1020 may also exchange data with a high-performance graphics circuit 1034 via a high-performance graphics interface 1036, using a PtP interface circuit 1037.

At least one embodiment of the invention may be provided by utilizing the processors 1002 and 1004. For example, the processors 1002 and/or 1004 may perform one or more of the operations of FIGS. 1-9. Other embodiments of the invention, however, may exist in other circuits, logic units, or devices within the system 1000 of FIG. 10. Furthermore, other embodiments of the invention may be distributed throughout several circuits, logic units, or devices illustrated in FIG. 10.

The chipset 1020 may be coupled to a bus 1040 using a PtP interface circuit 1041. The bus 1040 may have one or more devices coupled to it, such as a bus bridge 1042 and I/O devices 1043. Via a bus 1044, the bus bridge 1043 may be coupled to other devices such as a keyboard/mouse 1045, the network interface device 1030 discussed with reference to FIG. 10 (such as modems, network interface cards (NICs), or the like that may be coupled to the computer network 903), audio I/O device, and/or a data storage device 1048. The data storage device 1048 may store code 1049 that may be executed by the processors 1002 and/or 1004.

In various embodiments of the invention, the operations discussed herein, e.g., with reference to FIGS. 1-10, may be implemented as hardware (e.g., logic circuitry), software (including, for example, micro-code that controls the operations of a processor such as the processors discussed herein), firmware, or combinations thereof, which may be provided as a computer program product, e.g., including a tangible (e.g., non-transitory) machine-readable or computer-readable medium having stored thereon instructions (or software procedures) used to program a computer (e.g., a processor or other logic of a computing device) to perform an operation discussed herein. The machine-readable medium may include a storage device such as those discussed herein.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments of the invention, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Additionally, such computer-readable media may be downloaded as a computer program product, wherein the program may be transferred from a remote computer (e.g., a server) to a requesting computer (e.g., a client) by way of data signals, e.g., through a carrier wave or other propagation medium, via a communication link (e.g., a bus, a modem, or a network connection).

Thus, although embodiments of the invention have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. A method executed by a processor, the method comprising:
identifying a loop for speculative parallelization based on control and data dependence information;
generating one or more speculation guards to preserve speculation information, corresponding to the loop, in response to a determination that the loop is to be parallelized;
determining mis-speculation information for both control and data speculation based on execution of an inspection code, wherein the inspection code is to be generated based on the one or more speculation guards; and
generating one or more split loops, corresponding to the loop, based on the mis-speculation information, wherein the loop is parallelized based on successful data speculation for every iteration of a dependence edge, carried by the loop, between a store operation which has a non-linear array subscript and a load operation which has a linear or a non-linear array subscript.

2. The method of claim 1, further comprising analyzing optimization information to generate control and data dependence information.

3. The method of claim 2, wherein the optimization information is to comprise one or more of heuristics or profiling information.

4. The method of claim 1, further comprising determining whether to parallelize the loop, wherein determining whether to parallelize the loop is based on a determination of whether parallelizing the loop is to result in speed up.

5. The method of claim 1, further comprising generating a placeholder for the loop.

6. The method of claim 5, further comprising updating a control and data dependence graph corresponding of the placeholder.

7. The method of claim 6, wherein updating the control and data dependence graph is to comprise eliminating one or more highly unlikely taken branches and ignoring low probability data dependence.

8. The method of claim 1, further comprising applying analyses and transformations at a later phase of a compiler without change to accommodate the speculation information based on the one or more speculation guards, wherein the one or more speculation guards are to be generated at an earlier phase of the compiler.

9. The method of claim 1, further comprising generating the inspection code based on the one or more speculation guards.

10. The method of claim 1, wherein the one or more split loops are to comprise one or more of disjoint index set, fewer branches, or fewer loop carried dependences when compared to the loop.

11. A method executed by a processor, the method comprising:
storing in an index array a set of indices for which an if-condition of a loop is always true for only one iteration set; and
generating a plurality of subloops from the loop based on the index array, wherein the index array is to cause breaking of one or more control flow and data flow dependencies in the loop, wherein flow analysis for the set of indices is performed at compile time, while values of iteration subspaces, corresponding to the iteration set, are generated at runtime to break control and data flow dependences, wherein generating the plurality of subloops is performed in response to a determination that an if-condition with a single branch, such that a predicate of the if-condition depends on a loop index variable, being responsible for the one or more control flow dependences.

12. The method of claim 11, further comprising reordering the plurality of the subloops based on the index array.

13. The method of claim 11, wherein the index array is to comprise a subset of an iteration space of the loop constructed by selecting an iteration set in response to a flow or anti-flow dependency edge in the loop existing for only one iteration set.

14. The method of claim 11, further comprising generating a subloop based on the loop by replacing one or more occurrences of an index variable by a corresponding index array element.

15. The method of claim 11, further comprising generating two pre-computation loops for construction of the index array.

16. The method of claim 11, further comprising converting the loop into a two-level loop nest.

17. A non-transitory computer-readable medium comprising one or more instructions that when executed on a processor configure the processor to perform one or more operations to:
identify a loop for speculative parallelization based on control and data dependence information;
generate one or more speculation guards to preserve speculation information, corresponding to the loop, in response to a determination that the loop is to be parallelized;
determine mis-speculation information for both control and data speculation based on execution of an inspection code, wherein the inspection code is to be generated based on the one or more speculation guards; and
generate one or more split loops, corresponding to the loop, based on the mis-speculation information, wherein the loop is parallelized based on successful data speculation for every iteration of a dependence edge, carried by the loop, between a store operation which has a non-linear array subscript and a load operation which has a linear or a non-linear array subscript.

18. The computer-readable medium of claim 17, further comprising one or more instructions that when executed on a processor configure the processor to perform one or more operations to analyze optimization information to generate control and data dependence information.

19. The computer-readable medium of claim 17, further comprising one or more instructions that when executed on a processor configure the processor to perform one or more operations to determine whether to parallelize the loop based on a determination of whether parallelizing the loop is to result in speed up.

20. The computer-readable medium of claim 17, further comprising one or more instructions that when executed on a processor configure the processor to perform one or more operations to generate a placeholder for the loop.

21. The computer-readable medium of claim 17, further comprising one or more instructions that when executed on a processor configure the processor to perform one or more operations to update a control and data dependence graph corresponding of the placeholder.

22. The computer-readable medium of claim 17, further comprising one or more instructions that when executed on a processor configure the processor to perform one or more operations to apply analyses and transformations at a later phase of a compiler without change to accommodate the speculation information based on the one or more speculation guards, wherein the one or more speculation guards are to be generated at an earlier phase of the compiler.

23. The computer-readable medium of claim 17, further comprising one or more instructions that when executed on a processor configure the processor to perform one or more operations to generate the inspection code based on the one or more speculation guards.

24. A non-transitory computer-readable medium comprising one or more instructions that when executed on a processor configure the processor to perform one or more operations to:
  store in an index array a set of indices for which an if-condition of a loop is always true for only one iteration set; and
  generate a plurality of subloops from the loop based on the index array, wherein the index array is to cause breaking of one or more control flow and data flow dependencies in the loop, wherein flow analysis for the set of indices is performed at compile time, while values of iteration subspaces, corresponding to the iteration set, are generated at runtime to break control and data flow dependences, wherein generating the plurality of subloops is to be performed in response to a determination that an if-condition with a single branch, such that a predicate of the if-condition depends on a loop index variable, being responsible for the one or more control flow dependences.

25. The computer-readable medium of claim 24, further comprising one or more instructions that when executed on a processor configure the processor to perform one or more operations to reorder the plurality of the subloops based on the index array.

26. The computer-readable medium of claim 24, wherein the index array is to comprise a subset of an iteration space of the loop constructed by selecting an iteration set in response to a flow or anti-flow dependency edge in the loop existing for only one iteration set.

27. The computer-readable medium of claim 24, further comprising one or more instructions that when executed on a processor configure the processor to perform one or more operations to generate a subloop based on the loop by replacing one or more occurrences of an index variable by a corresponding index array element.

28. The computer-readable medium of claim 24, further comprising one or more instructions that when executed on a processor configure the processor to perform one or more operations to generate two pre-computation loops for construction of the index array.

29. The computer-readable medium of claim 24, further comprising one or more instructions that when executed on a processor configure the processor to perform one or more operations to convert the loop into a two-level loop nest.

* * * * *

UNITED STATES PATENT AND TRADEMARK OFFICE
CERTIFICATE OF CORRECTION

PATENT NO. : 8,793,675 B2
APPLICATION NO. : 12/978465
DATED : July 29, 2014
INVENTOR(S) : Jin Lin et al.

It is certified that error appears in the above-identified patent and that said Letters Patent is hereby corrected as shown below:

On title page 2, under "Other Publications", in column 1, line 11, Delete "10.1007/02F978" and insert -- 10.1007%2F978 --, therefor.

On title page 2, under "Other Publications", in column 1, line 15, Delete "10.1007/02F3-54" and insert -- 10.1007%2F3-54 --, therefor.

On title page 2, under "Other Publications", in column 1, line 32, Delete "progaimming" and insert -- programming --, therefor.

On title page 2, under "Other Publications", in column 2, line 46, Delete "Predicition," and insert -- Prediction, --, therefor.

In drawing sheets,

Sheet 2 of 8, Fig. 2, line 4, Delete "(i=0;i<n;i)" and insert -- (i=0;i<n;i++) --, therefor.

Sheet 2 of 8, Fig. 2, line 9, Delete "(i-0;i<n;i++)" and insert -- (i=0;i<n;i++) --, therefor.

Sheet 2 of 8, Fig. 3, line 29, Delete "gurad" and insert -- guard --, therefor.

Sheet 2 of 8, Fig. 3, line 49, Delete "iteartion" and insert -- iteration --, therefor.

Sheet 4 of 8, Fig. 5, line 4, Delete "gurad" and insert -- guard --, therefor.

Sheet 5 of 8, Fig. 6, line 1, Delete "spcculation" and insert -- speculation --, therefor.

Sheet 5 of 8, Fig. 6, line 1, Delete "spcculation" and insert -- speculation --, therefor.

Sheet 5 of 8, Fig. 6, line 6, Delete "spcculation" and insert -- speculation --, therefor.

Sheet 5 of 8, Fig. 6, line 10, Delete "spcculation" and insert -- speculation --, therefor.

Signed and Sealed this
Twenty-first Day of April, 2015

Michelle K. Lee
*Director of the United States Patent and Trademark Office*

CERTIFICATE OF CORRECTION (continued)
U.S. Pat. No. 8,793,675 B2

Sheet 5 of 8, Fig. 6, line 10, Delete "false" and insert -- falsc --, therefor.

Sheet 5 of 8, Fig. 6, line 11, Delete "spcculation" and insert -- speculation --, therefor.

Sheet 5 of 8, Fig. 6, line 16, Delete "spcculation" and insert -- speculation --, therefor.

Sheet 5 of 8, Fig. 6, line 16, Delete "false" and insert -- falsc --, therefor.

Sheet 5 of 8, Fig. 6, line 17, Delete "lowcr" and insert -- lower --, therefor.

Sheet 5 of 8, Fig. 6, line 17, Delete "uppcr" and insert -- upper --, therefor.

Sheet 5 of 8, Fig. 6, line 20, Delete "lowcr" and insert -- lower --, therefor.

Sheet 5 of 8, Fig. 6, line 20, Delete "lowcr" and insert -- lower --, therefor.

Sheet 5 of 8, Fig. 6, line 21, Delete "spcculation" and insert -- speculation --, therefor.

Sheet 5 of 8, Fig. 6, line 24, Delete "lowcr" and insert -- lower --, therefor.

Sheet 5 of 8, Fig. 6, line 24, Delete "uppcr" and insert -- upper --, therefor.

Sheet 5 of 8, Fig. 6, line 24, Delete "c" and insert -- e --, therefor.

Sheet 5 of 8, Fig. 6, line 28, Delete "spcculation" and insert -- speculation --, therefor.

Sheet 5 of 8, Fig. 6, line 28, Delete "c[i]" and insert -- e[i] --, therefor.

Sheet 5 of 8, Fig. 6, line 34, Delete "inspcction" and insert -- inspection --, therefor.

Sheet 5 of 8, Fig. 6, line 34, Delete "gcncration" and insert -- generation --, therefor.